(12) United States Patent
Callow et al.

(10) Patent No.: US 11,724,923 B1
(45) Date of Patent: Aug. 15, 2023

(54) ACTIVE TETHER CONTROL FOR A TETHERED MULTIROTOR

(71) Applicant: National Technology & Engineering Solutions of Sandia, LLC, Albuquerque, NM (US)

(72) Inventors: Diane Schafer Callow, Albuquerque, NM (US); Steven James Spencer, Albuquerque, NM (US); Scott E. Rose, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 573 days.

(21) Appl. No.: 16/875,010

(22) Filed: May 15, 2020

(51) Int. Cl.
| | | |
|---|---|---|
| *B66D 1/50* | (2006.01) | |
| *B65H 59/38* | (2006.01) | |
| *B65H 75/42* | (2006.01) | |
| *B65H 75/44* | (2006.01) | |
| *B66D 1/38* | (2006.01) | |
| *B66D 1/20* | (2006.01) | |
| *B64F 3/00* | (2006.01) | |
| *B65H 59/40* | (2006.01) | |

(52) U.S. Cl.
CPC ............... *B66D 1/505* (2013.01); *B64F 3/00* (2013.01); *B65H 59/384* (2013.01); *B65H 75/42* (2013.01); *B65H 75/4484* (2013.01); *B66D 1/20* (2013.01); *B66D 1/38* (2013.01); *B65H 59/40* (2013.01); *B65H 2701/365* (2013.01)

(58) Field of Classification Search
CPC .. B66D 1/20; B66D 1/38; B66D 1/505; B64F 3/00; B65H 75/42; B65H 75/4407; B65H 75/4484; B65H 59/40; B65H 59/384
See application file for complete search history.

(56) References Cited

U.S. PATENT DOCUMENTS

| | | | | |
|---|---|---|---|---|
| 5,280,879 A | * | 1/1994 | Kreuter | B61B 12/10 254/383 |
| 5,562,556 A | * | 10/1996 | Carson | F16H 7/04 474/62 |
| 2016/0083115 A1 | * | 3/2016 | Hess | B64C 39/022 701/3 |
| 2017/0259941 A1 | * | 9/2017 | Briggs, IV | B64C 39/024 |

(Continued)

FOREIGN PATENT DOCUMENTS

WO   WO-2017165854 A2   *   9/2017   ............. B60L 50/60

*Primary Examiner* — Emmanuel M Marcelo
(74) *Attorney, Agent, or Firm* — Daniel J. Jenkins

(57) ABSTRACT

A control system and method for tensioning an active tether for a multirotor unmanned aerial system is provided. The control system includes a tensioning pulley and a tensioning spring. The tensioning spring is arranged to generate a variable tension force on the active tether. A transducer is connected adjacent to the tensioning spring to sense a linear displacement position of the tensioning pulley and to transmit a position signal to a controller. The position signal is proportional to the linear displacement position. A servomotor in communication with the controller receives a control signal from the controller in response to the position signal. The servomotor drives a cable reel. The cable reel is rotatably mounted in the frame for spooling the tether in response to rotation of the servomotor. The cable reel is rotated by the servomotor to maintain a predetermined tension on the tensioning spring.

20 Claims, 4 Drawing Sheets

(56) References Cited

U.S. PATENT DOCUMENTS

| | | | |
|---|---|---|---|
| 2020/0225684 A1* | 7/2020 | Anderson | B64C 39/024 |
| 2020/0385115 A1* | 12/2020 | Piasecki | H04B 10/2575 |
| 2021/0061487 A1* | 3/2021 | Briggs, IV | B66D 1/38 |
| 2021/0309401 A1* | 10/2021 | Lopes | B65B 11/00 |

* cited by examiner

ACTIVE TETHER CONTROL FOR A TETHERED MULTIROTOR

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to an active tether control system for a tethered multirotor. The application relates more specifically to an active tether control system for a tethered multirotor to control the tension on the tether while the multirotor is airborne.

Unmanned aerial systems (UAS) such as multirotor drones may be self powered autonomous flying vehicles, or tethered aerial vehicles. Autonomous flying vehicles require onboard power and wireless communications systems that add considerable weight, which limits the range and operating time of the UAS. Tethered UAS may have reduced weight for longer airborne operation, as they receive power and control signals via the tether. Tethered UAS are also able to operate independently or under human control, such that the UAS will not fly-away. These tethered UAS can be equipped with a variety of sensors, e.g., for surveillance or data gathering. In addition to restricting the flight range of a UAS, the tether may deliver power and bidirectional data communications to the aerial vehicle. Depending on the ground station power source, a UAS may stay aloft indefinitely, a highly desired feature of a UAS.

When using a tether for a UAS, managing the cable tension is a challenge for the operator. While the weight of the tether may serve to provide tension during ascent, wind currents may generate undesired stress or slack on the tether. Further, while descending, excess cable slack may cause the cable to pile up and become tangled. Excess tension, meanwhile, may interfere with flight controls and damage the UAS. Thus, it would be desirable to provide a system and method to control tension on an active tether for flying a UAS.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

A reel control system of the present disclosure provides constant tension on a tether for use in a tethered multi-rotor system. The tether is a control cable wound on a rotary cable reel. Rotation of the reel is driven by a servomotor. The tether runs through a plurality of pulleys mounted in the reel case. The tether exits the reel case and connects to an unmanned aerial system, or UAS. One of the pulleys is connected to a spring. The tension in the tether is proportional to the force on the pulley which is proportional to the linear displacement of the spring. A linear displacement transducer is used to measure the compression or extension of the spring attached to the pulley. Measurement from the linear displacement transducer is used as feedback for the servomotor controller. The control system moves the servomotor and thus, the cable reel, so that the tether is reeled in or out to maintain a predetermined range of tension on the tether.

One embodiment relates to a control system for tensioning an active tether for a multirotor unmanned aerial system, the control system includes a tensioning pulley and a tensioning spring. The tensioning spring is arranged to generate a variable tension force on the active tether. A transducer is connected adjacent to the tensioning spring to sense a linear displacement position of the tensioning pulley and to transmit a position signal to a controller. The position signal is proportional to the linear displacement position. A servomotor in communication with the controller receives a control signal from the controller in response to the position signal. The servomotor drives a cable reel. The cable reel is rotatably mounted in the frame for spooling the tether in response to rotation of the servomotor. The cable reel is rotated by the servomotor to maintain a predetermined tension on the tensioning spring.

Another embodiment relates to a method for controlling an active tether includes: transmitting a desired motor current setpoint to a current controller; rotating the motor in response to the applied current and driving a cable reel in response thereto; applying a spring tension to a tensioning pulley responsive to the position of the motor; generating a feedback signal proportional to the tensioning pulley position; computing the desired current at the output of tension controller required to drive the cable reel to apply the desired tension on the active tether; and returning an estimated tension feedback signal to the operator for verification of proper functionality of the controller.

Yet another embodiment relates to a control system for tensioning an active tether for a multirotor unmanned aerial system that includes a tensioning pulley and a tensioning spring. The tensioning spring generates a variable tension force on the active tether. A transducer is connected adjacent to the tensioning spring to sense a linear displacement position of the tensioning pulley and to transmit a position signal to a controller. The position signal is proportional to the linear displacement position. A servomotor in communication with the controller receives a control signal from the controller. The controller is configured to transmit a desired motor current setpoint to a current controller; generate a motor position feedback signal indicative of a desired motor position; receive a motor position feedback signal in response to generating the motor position feedback signal; read the desired current at the output of tension controller; and return an estimated tension feedback signal to generate an output current required to drive the cable reel to a position to apply the desired tension on the active tether. The servomotor drives a cable reel in response to the estimated tension feedback signal. The cable reel is rotatably mounted in the frame for spooling the tether in response to rotation of the servomotor. The cable reel is rotated by the servomotor to maintain a predetermined tension on the tensioning spring.

An advantage of the present invention is the ability to control the tension on an active tether.

Another advantage is automatically adjusting the tension through a cable reel and pulley assembly.

Another advantage is automatic sensing and adjustment of tension in real time on an active tether.

Yet another advantage is the ability to add a compliant degree of freedom between the reel and the multirotor, to allow rapid acceleration of the multirotor without significantly changing tension and to allow estimation of the tension using displacement.

Still another advantage is an evenly controlled distribution of the active tether on a rotary cable reel as the reel spools and unspools the tether.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
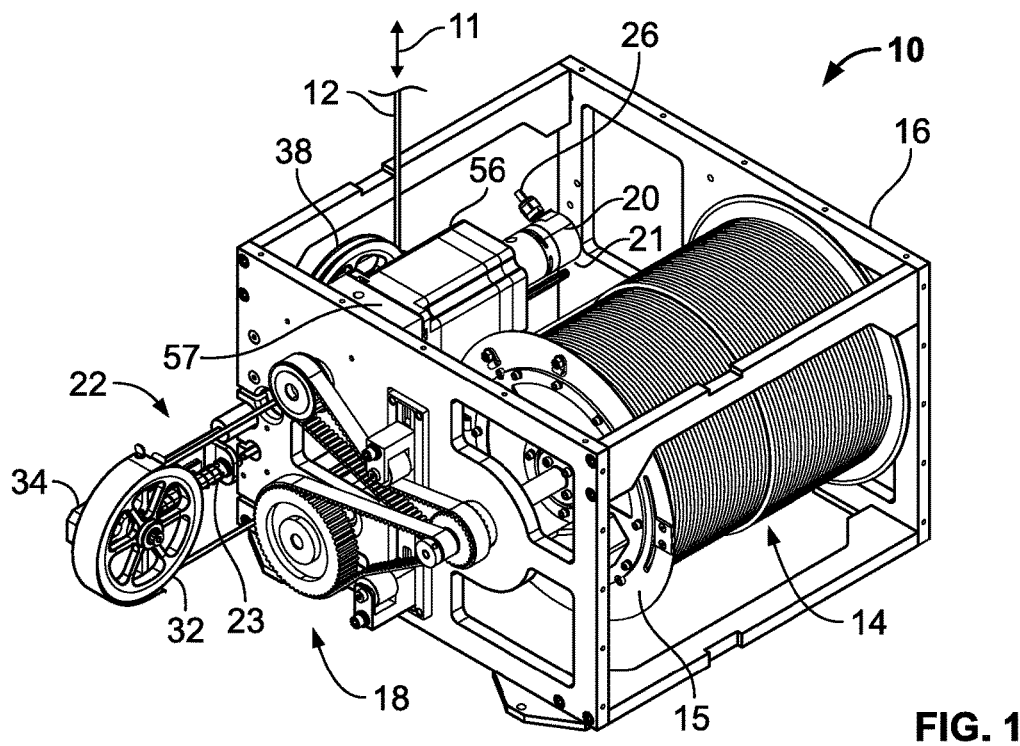
FIG. 1 shows an isometric view of an active tether control system of the disclosure.
Figure 2:
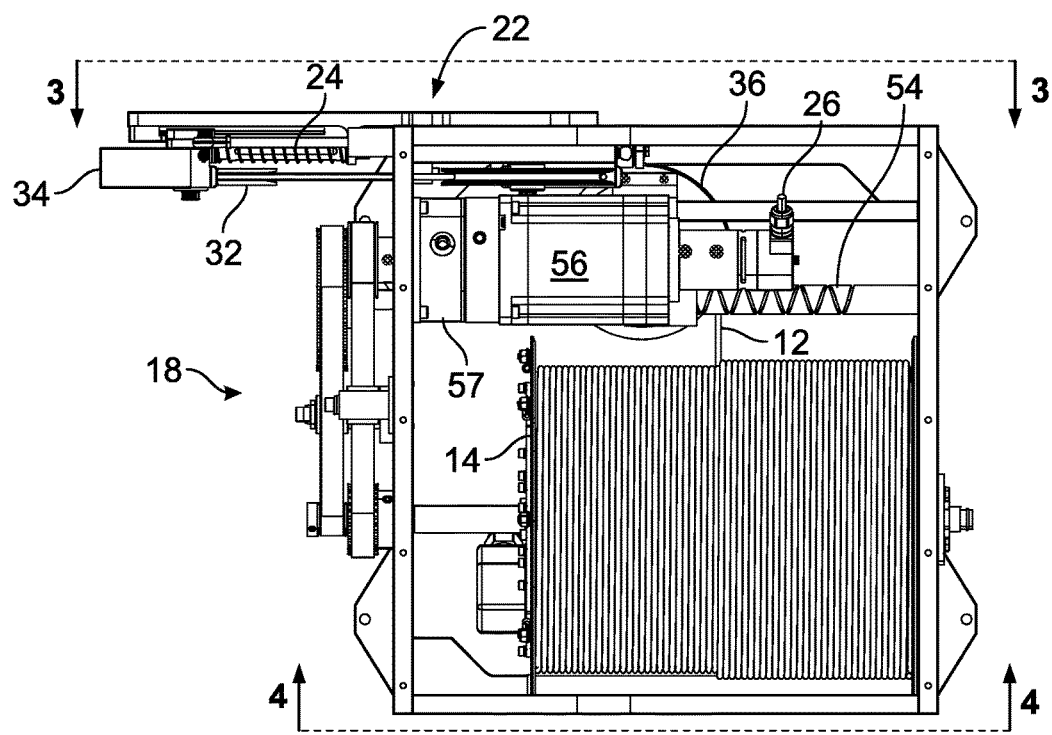
FIG. 2 shows a plan view of the active tether control system of FIG. 1.

Referring to FIGS. 1 and 2, an exemplary embodiment of an active tether control system 10 of the disclosure is shown. An active tether 12 may include control signal and power wiring to a multi-rotor UAS (not shown), which is connected at one end to the UAS flying overhead. Tether 12 extends and retracts as necessary to maintain a desirable tension, to prevent sagging while allowing minimal resistance to fly the UAS. Bi-directional motion of tether 12 is indicated by arrow 11. A cable reel 14 stores tether 12 on a drum portion 15 rotatably mounted on a rectangular frame 16. A drive assembly 18 is provided to rotate the drum clockwise and counterclockwise in response to a transducer signal responsive to the tension on tether 12.

Figure 4:
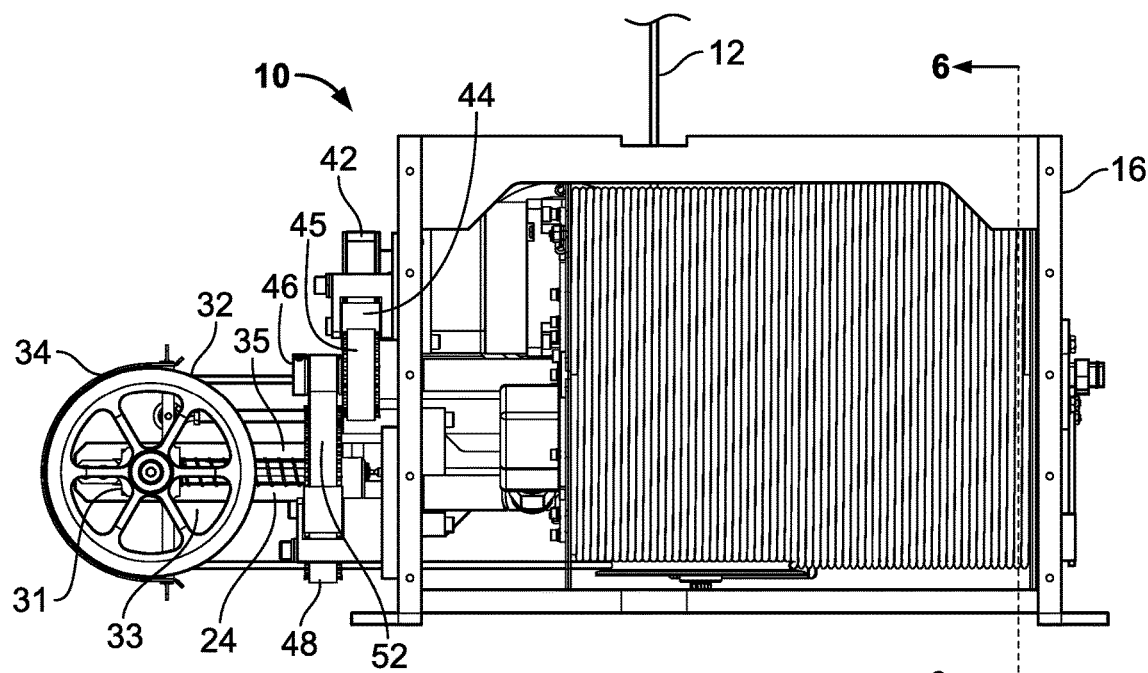
FIG. 4 shows an elevational view of the active tether control system of FIG. 2 taken along the lines 4-4.

A servomotor 56 receives electrical power via power cable 21 to actuate drive assembly 18. A rotary encoder 20 provides feedback through feedback cable 26 to a motor controller (not shown), as described in greater detail below. Drive assembly 18 rotates cable reel 14, which feeds tether 12 through a tensioning system 22. Tether winds through a pulley arrangement, including tensioning pulley 32. Tensioning pulley 32 is attached to a spring 24 by slider portion 31 at hub 33 (FIG. 4). Spring 24 applies tension on slider portion 31. Tether exits tensioning pulley 32 and feeds around vertical idler pulley 38, where tether is directed upwards and out of frame 16 to the UAS. Tether is shielded by a cover 34 on pulley 32. In alternate embodiments, servomotor 56 may be a hydraulic servomotor, pneumatic servomotor, or similar rotary torque control device.

Figure 3:
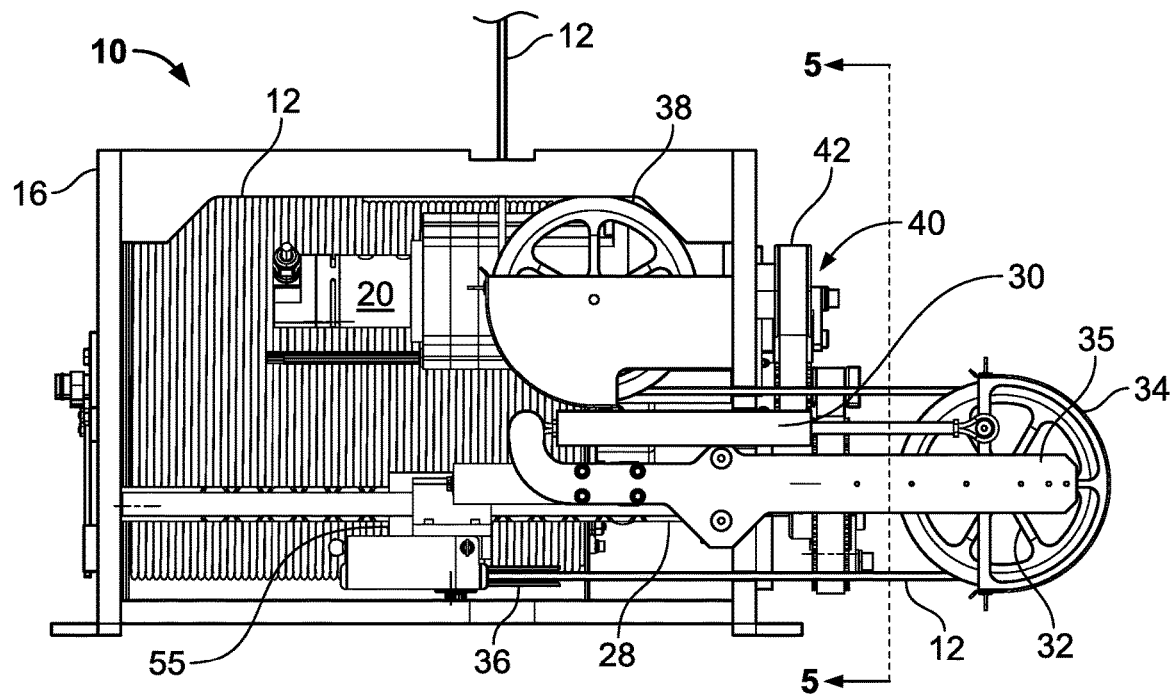
FIG. 3 shows an elevational view of the active tether control system of FIG. 2 taken along the lines 3-3.

As shown in FIG. 2 and FIG. 3, a drum feeder pulley 36 is arranged in a plane perpendicular with tensioning pulley 32. Drum feeder pulley 36 directs tether 12 from cable reel 14 to the bottom of tensioning pulley 32. Drum feeder pulley 36 reciprocally traverses levelwind screw 54 on levelwind mechanism 55 to guide tether uniformly onto cable reel 14. Levelwind screw 54 is rotated synchronously with cable reel 14 to reciprocate levelwind mechanism 55. A position transducer 30 is connected to cover 34 and senses the position of tensioning pulley 32 due to spring force applied by tensioning spring 24. Tensioning pulley 32 is slidably mounted in a guide channel 35 by a slider portion 31 connected to pulley 32 via bearing 33. Slider portion 31 extends and retracts pulley 32 within guide channel 35 in response to tension on tether 12 from cable reel 14. Spring 24 is connected to slider portion 31 at one end and to a fixed bracket 23 on frame 16 at the opposite end. Spring 24 provides a compliant degree of freedom between the reel and the multirotor, which serves to allow rapid acceleration of the multirotor without significantly changing tension, and to allow estimation of the tension using displacement. A brake 57 is attached to the output of motor 56 to prevent unraveling of tether 12.

Figure 5:
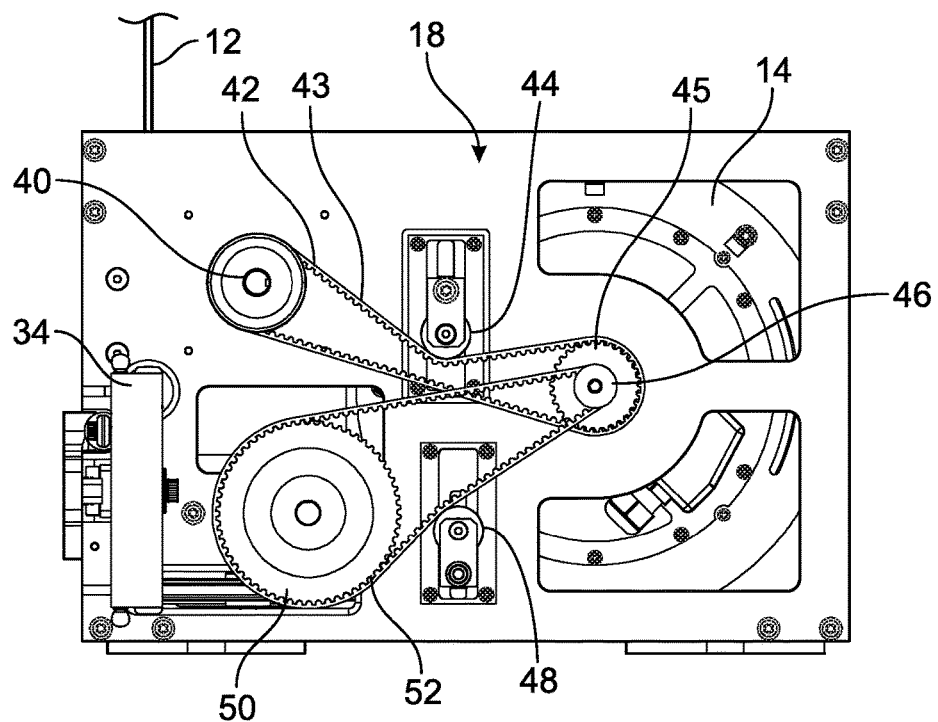
FIG. 5 shows an elevational view of the active tether control system of FIG. 3 taken along the lines 5-5.

Drive assembly 18 is shown in FIG. 4 and FIG. 5. The output shaft of servomotor 56 is connected to a toothed gear 40. Gear 40 drives drum portion 15 via toothed gear via a flexible toothed belt 42. Toothed belt 42 includes a plurality of teeth 43 corresponding with teeth on gears 40, 45 to maintain synchronous rotation of drum 15, cable reel 14 and levelwind screw 54. An idler roller 44 applies force to toothed belt 42 to maintain torque transfer between gears 40, 45. A second set of gears 50 transfers rotation between drum shaft 46 and levelwind 54. Shaft 46 includes splines or gear teeth to engage a toothed belt 52 that engages and drives toothed gear 50. Toothed gear 50 is connected to levelwind screw 54 to transfer rotational motion to reciprocating linear motion of levelwind mechanism 55. An idler roller 48 maintains tension on belt 52 when installed. Idlers 44, 48 may be adjustable to allow ease of installation of belts 42, 52, respectively, and to apply tension when the system 10 is in operation.

Figure 6:
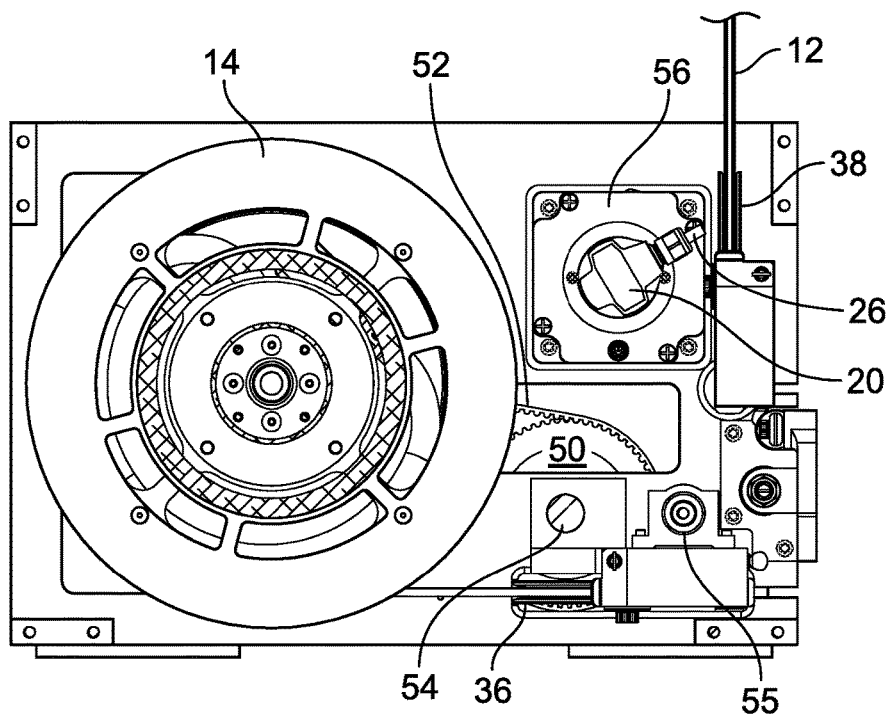
FIG. 6 shows a sectional view of the active tether control system of FIG. 4 taken along the lines 6-6.

FIG. 6 shows a sectional view taken along lines 6-6 in FIG. 4. Components of system 10 are shown from the opposite side view from FIG. 5. Cable reel 14 and drum 15 are shown with tether 12 feeding from the bottom of cable reel 14 to drum feeder pulley 36. Levelwind mechanism 55 is shown adjacent to levelwind screw 54, and the drive gear 50 engaged with toothed belt 52. Servomotor 56 is positioned above levelwind screw 54 with rotary encoder 20 attached to servomotor 56. A feedback signal cable 26 is provided, extending from encoder 20 to transmit cable tension parameters to a controller (not shown). The tension controller may collect motor position data to indicate to an operator the length of tether deployed. Also, the motor current controller may use motor position feedback for ensuring the current direction through the 3-phase Brushless DC motor windings is applied to produce torque in the correct rotation. In alternate embodiments, the rotational motion of the servomotor to the cable reel may be accomplished by chains, gears and other synchronization means, in place of the toothed belt arrangement.

Figure 7:
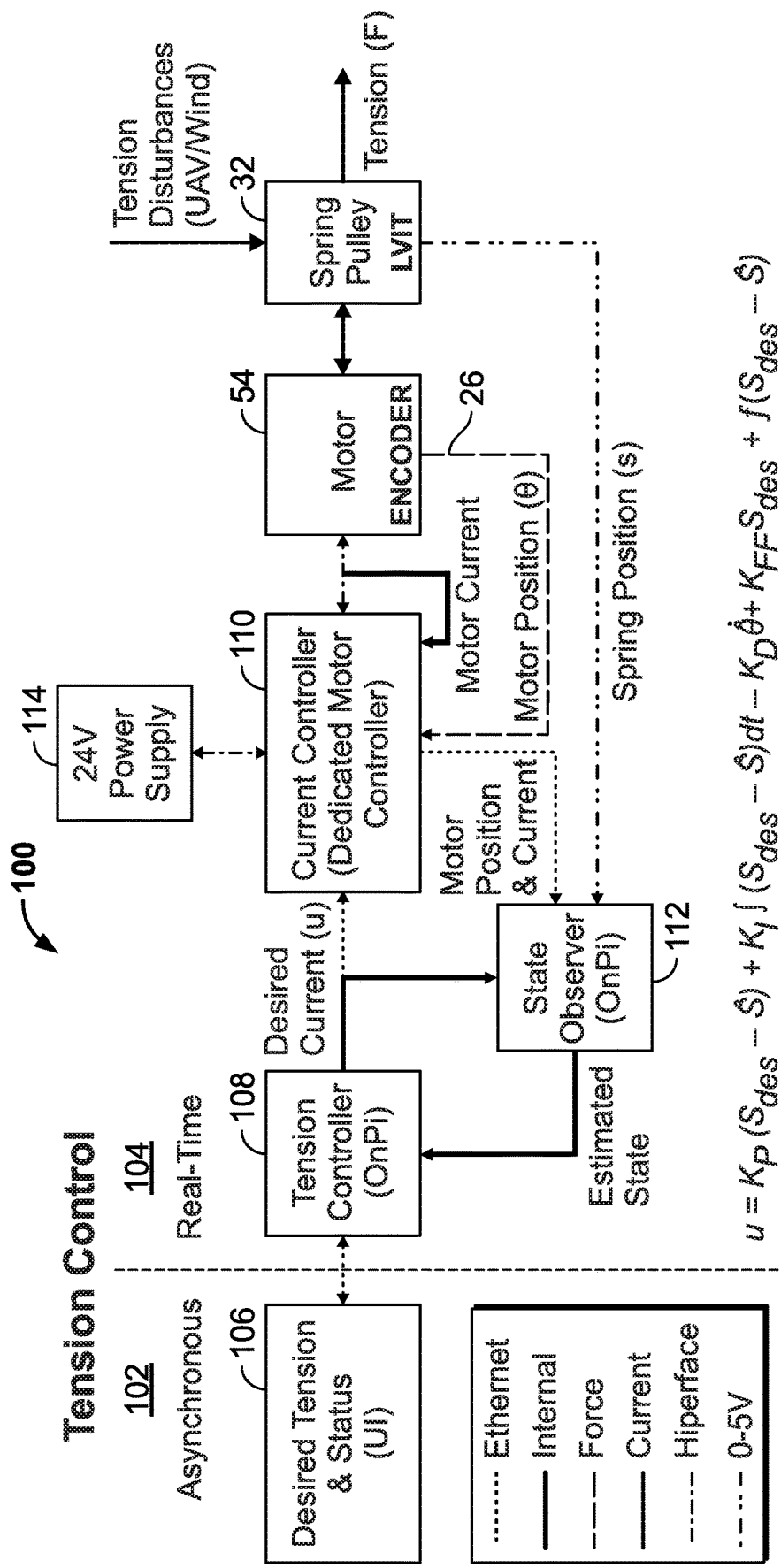
FIG. 7 shows an exemplary control process feedback loop for active tether control for a UAS.

Referring next to FIG. 7, an exemplary control process feedback loop designated as 100 is described as follows. An asynchronous portion 102 indicates parameters and setpoints that are time independent. A real-time portion 104 indicates active parameters associated with the active tether control system. Active parameters 104 are sensed and transmitted in real time. User interface 106 allows a user to set operating parameters and observe the status of the control system 100. User interface 106 is in data communication with an input port of a tension controller 108. Tension controller 108 output transmits a desired current output or setpoint u. In an exemplary embodiment, tension controller may be a programmable single board computer (SBC) with a 64-bit computer processor, or similar digital processor.

Current output u is transmitted to an input port of a current controller 110. In an exemplary embodiment, current controller 110 may be a dedicated motor controller, e.g., a digital servo drive to control torque, velocity, or position mode with Space Vector Modulation (SVM). Current controller 110 outputs a motor current control signal to servomotor 56 coupled with a rotary encoder 20. Rotary encoder 20 generates a motor position or angle signal θ to a feedback port of current controller 110 via cable 21. Cable 26 transmits motor position feedback from the encoder 20 to controller 110 and delivers power to operate encoder 20. The current level of motor 56 is transmitted with position signal to a feedback port in current controller 110 via cable 26 as well. Current is measured by current controller 110. Cable 21 carries the current from the controller to the motor. Motor 56 rotates in response to signal u to turn cable reel 14, and thus applying spring tension via tensioning pulley 32. Tensioning pulley 32 responds to tension disturbances on the unmanned aerial vehicle, e.g., a multi-rotor drone. Tension disturbances on tether 12 may be caused by wind currents, UAS altitude changes, or other variable conditions affecting the loading on tether 12. Tensioning pulley 32 applies a tension force F on the UAS, and acts on a linear displacement transducer, or position transducer 30. Position transducer 30 generates a feedback signal s proportional to the tensioning pulley position. In an embodiment, position transducer 30 may be a linear variable inductance transducer. Signal s is transmitted from position transducer 30 to a state observer module 112. State observer module 112 receives a feedback signal from current controller 110 indicating the motor position and current and reads the desired current u at the output of tension controller 108. State observer module 112 returns an estimated state feedback signal to tension controller 108 to close the feedback loop of real-time portion 104. Power for current controller 110 is provided by a power supply 114. The desired output current u may be determined by programming tension controller 108 to execute the following algorithm:

$$u = K_P(s_{des} - \hat{s}) + K_I \int (s_{des} - \hat{s})dt - K_D \dot{\theta} + K_{FF}s_{des} + f(s_{des} - \hat{s})$$

wherein:
Kp=a proportional gain on the position error of the slider;
$S_{des}$=desired slider position;
s=measured slider position;
$K_I$=a gain on the integral of the slider error;
$K_D$=damping gain on the motor angle;
$K_{FF}$=feedforward torque for achieving the desired slider position; and
f=friction compensation function.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the active tether control system for a tethered multirotor as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media include non-transitory memory on which instructions are recorded for performing the disclosed methods. Machine-readable media may be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A control system for tensioning an active tether for a multirotor unmanned aerial system, the control system comprising:
a tensioning pulley and a tensioning spring;
the tensioning spring arranged to generate a variable tension force on the active tether;
a transducer connected adjacent to the tensioning spring to sense a linear displacement position of the tensioning pulley and to transmit a position signal to a controller, the position signal proportional to the linear displacement position;
a servomotor in communication with the controller for receiving a control signal from the controller in response to the position signal; and
the servomotor configured to drive a cable reel, the cable reel being rotatably mounted in a frame for spooling the tether in response to rotation of the servomotor;
wherein the cable reel is rotated by the servomotor to maintain a predetermined tension on the tensioning spring.

2. The control system of claim 1, further comprising:
a slide portion attached to the tensioning pulley;
a slide channel;
a pulley cover affixed to the tensioning pulley;
the tensioning spring connected between the slide portion and a fixed bracket portion disposed on a frame; and
the slide portion slidably disposed within the slide channel to provide linear movement of the tensioning pulley within the slide channel.

3. The control system of claim 1, wherein the transducer comprises a linear variable induction transducer attached at one end to the pulley cover.

4. The control system of claim 1, wherein the servomotor having a first toothed gear connected to a rotary drive shaft of the servomotor; and the cable reel having a second toothed gear connected to an axial shaft of the cable reel; the first toothed gear and the second toothed gear connected in synchronous rotation by a toothed drive belt engaging the first toothed gear and the second toothed gear.

5. The control system of claim 4, wherein the levelwind screw having a third toothed gear, the third toothed gear being linked in synchronous rotation with the cable reel by a fourth toothed gear, and a second toothed belt engaging the third toothed gear and the fourth toothed gear to drive rotation therebetween.

6. The control system of claim 1, further comprising a levelwind mechanism and a levelwind screw wherein the cable reel being linked to the levelwind screw to rotate the levelwind screw; the levelwind mechanism movably driven in response to rotation of the levelwind screw to bi-directionally traverse the levelwind screw and distribute the tether evenly about the cable reel.

7. The control system of claim 1, further comprising a first idler pulley disposed adjacent the cable reel to direct the active tether to the tensioning pulley perpendicular to a direction of rotation of the cable reel.

8. The control system of claim 7, further comprising a second idler pulley for receiving the active tether from the tensioning pulley and directing the active tether perpendicular to a direction of the tensioning pulley.

9. The control system of claim 1, further comprising an encoder;
wherein the servomotor is coupled with the encoder; and
the encoder is in communication with the controller via a feedback signal cable and configured to transmit a plurality of control parameters to the controller.

10. A method for controlling an active tether comprising:
transmitting a desired motor current setpoint to a current controller;
rotating a motor and driving a cable reel;
applying a spring tension to a tensioning pulley responsive to the position of the tensioning pulley;
generating a feedback signal proportional to the tensioning pulley position;
receiving a tensioning pulley position feedback signal;
reading the desired current at an output of a tension controller; and
returning an estimated tension feedback signal required to drive the cable reel to a position to apply a desired tension on the active tether.

11. The method of claim 10, further comprising:
determining an output current by programming a tension controller to execute the algorithm:

$$u = K_P(s_{des} - \hat{s}) + K_I \int (s_{des} - \hat{s})dt - K_D\dot{\theta} + K_{FF}s_{des} + f(s_{des} - \hat{s})$$

wherein:
Kp=a proportional gain on the position error of the slider;
$S_{des}$=desired slider position;
s=measured slider position;
$K_I$=a gain on the integral of the slider error;
$K_D$=damping gain on the motor angle;
$K_{FF}$=feedforward torque for achieving the desired slider position; and
f=friction compensation function.

12. The method of claim 11, further comprising providing a plurality of static input parameters and setpoints and providing a plurality of active parameters to the tension controller.

13. The method of claim 10, wherein the current controller comprises a digital servo drive configured to control a torque, velocity, and position mode with Space Vector Modulation.

14. The method of claim 10, wherein the spring tension being responsive to movement of a multi-rotor drone connected to the active tether; and to tension disturbances on the active tether in response to variable conditions affecting the loading on the active tether.

15. The method of claim 10, further comprising applying a tension force on the tether in response to a position transducer.

16. The method of claim 15, further comprising transmitting the feedback signal from the position transducer to a state observer module.

17. A control system for tensioning an active tether for a multirotor unmanned aerial system, the control system comprising:

a tensioning pulley and a tensioning spring;
the tensioning spring arranged to generate a variable tension force on the active tether;
a transducer connected adjacent to the tensioning spring to sense a linear displacement position of the tensioning pulley and to transmit a position signal to a controller, the position signal proportional to the linear displacement position;
a servomotor in communication with the controller for receiving a control signal from the controller;
the controller configured to:
    transmit a desired motor current setpoint to a current controller;
    receive a motor position feedback signal indicative of motor position;
    read the desired current at the output of a tension controller; and
    return an estimated tension feedback signal to generate an output current required to drive the cable reel to a position to apply the desired tension on the active tether;
the servomotor configured to drive a cable reel in response to the estimated tension feedback signal, the cable reel being rotatably mounted in the frame for spooling the tether in response to rotation of the servomotor;
wherein the cable reel is rotated by the servomotor to maintain a predetermined tension on the tensioning spring.

18. The control system of claim 17, wherein the controller is further configured to determine the output current based on the algorithm:

$$u = K_P(s_{des} - \hat{s}) + K_I \int (s_{des} - \hat{s})dt - K_D\dot{\theta} + K_{FF}s_{des} + f(s_{des} - \hat{s})$$

wherein:
u=output current;
Kp=a proportional gain on the position error of the slider;
$S_{des}$=desired slider position;
s=measured slider position;
$K_I$=a gain on the integral of the slider error;
$K_D$=damping gain on the motor angle;
$K_{FF}$=feedforward torque for achieving the desired slider position; and
f=friction compensation function.

19. The control system of claim 17, wherein the servomotor having a first toothed gear connected to a rotary drive shaft of the servomotor; and the cable reel having a second toothed gear connected to an axial shaft of the cable reel; the first toothed gear and the second toothed gear connected in synchronous rotation by a toothed drive belt engaging the first toothed gear and the second toothed gear.

20. The control system of claim 17, further comprising a levelwind mechanism and a levelwind screw wherein the cable reel being linked to the levelwind screw to rotate the levelwind screw; the levelwind mechanism movably driven in response to rotation of the levelwind screw to bi-directionally traverse the levelwind screw and distribute the tether evenly about the cable reel.

* * * * *